(12) United States Patent
Morse et al.

(10) Patent No.: US 7,210,363 B2
(45) Date of Patent: May 1, 2007

(54) SCAN TESTABLE FILTER HOUSING ASSEMBLY FOR EXHAUST APPLICATIONS

(75) Inventors: Thomas C. Morse, Greenville, NC (US); Mark Huza, Columbia, MD (US)

(73) Assignee: Camfil Farr, Inc., Riverdale, NJ (US)

( * ) Notice: Subject to any disclaimer, the term of this patent is extended or adjusted under 35 U.S.C. 154(b) by 0 days.

(21) Appl. No.: 11/197,272

(22) Filed: Aug. 4, 2005

(65) Prior Publication Data

US 2006/0042359 A1 Mar. 2, 2006

Related U.S. Application Data

(60) Provisional application No. 60/598,627, filed on Aug. 4, 2004.

(51) Int. Cl.
*G01N 1/22* (2006.01)
*G01N 1/20* (2006.01)

(52) U.S. Cl. .................. 73/863.23; 73/37; 73/40; 73/49.7; 55/385.3

(58) Field of Classification Search ............ 73/40, 73/37, 49.7, 863.23; 55/385.3
See application file for complete search history.

(56) References Cited

U.S. PATENT DOCUMENTS

| | | | | |
|---|---|---|---|---|
| 4,235,098 A | * | 11/1980 | Tisch | 73/863.23 |
| 4,382,808 A | * | 5/1983 | Van Wormer et al. | 55/418 |
| 4,478,138 A | * | 10/1984 | Venditti et al. | 454/251 |
| RE32,722 E | * | 8/1988 | Johnson | 96/108 |
| 7,040,088 B2 | * | 5/2006 | Covit | 60/300 |
| 7,041,146 B2 | * | 5/2006 | Bugli et al. | 55/481 |
| 7,041,157 B1 | * | 5/2006 | Fleck | 95/273 |
| 7,081,145 B2 | * | 7/2006 | Gieseke et al. | 55/330 |
| 7,081,154 B2 | * | 7/2006 | Schulte et al. | 95/273 |
| 2002/0157455 A1 | * | 10/2002 | Sagi et al. | 73/40 |
| 2004/0045376 A1 | * | 3/2004 | Van Netten | 73/863.23 |
| 2006/0163125 A1 | * | 7/2006 | Olivier et al. | 210/86 |

OTHER PUBLICATIONS

Owner's Manual KA-464-A, "MicroPleat HEPA Fan/Filter Modulte", Airguard, a Clarcor company, Feb. 4, 2004.☐☐http://www.airguard.com.*
ESH manual, "Work Enclosures and Local Exhaust Systems for Toxic and Radioactive Materials", vol. II: Health & Safety—Controls and Hazards—> Part 12: General H&S Controls—Safety Equipment and Facilities, Jun. 19, 2001. http://www.llnl.gov/es_and_h/hsm/doc_12.04/doc12-04.html.*
"Pharmaseal", Product sheet 3420-0303, Camfil Farr, Inc. Washington NC, © Camfil Farr, Date Unknown.

* cited by examiner

*Primary Examiner*—Hezron Williams
*Assistant Examiner*—Samir M. Shah
(74) *Attorney, Agent, or Firm*—Keith Taboada, Esq.; Patterson & Sheridan, LLP

(57) ABSTRACT

A filter housing assembly for exhaust applications and method of testing the same is provided. In one embodiment, the filter housing assembly includes a housing having a filter receiving aperture, a first air flow port configured to couple the housing to an exhaust system and a second air flow port sized to deliver a flow capable of providing at least 75 feet per minute of air flow through the filter receiving aperture. A filter element is sealingly disposed in the filter receiving aperture of the housing. A cap is provided that operably seals the second air flow port when not in use. In another embodiment, a method for testing a filter housing assembly for exhaust applications includes providing air through a filter element disposed in the housing in a direction opposite an operational air flow direction, leak testing the filter element from a roomside of the filter element, and, flowing air through the filter element after leak testing in the operational direction.

17 Claims, 11 Drawing Sheets

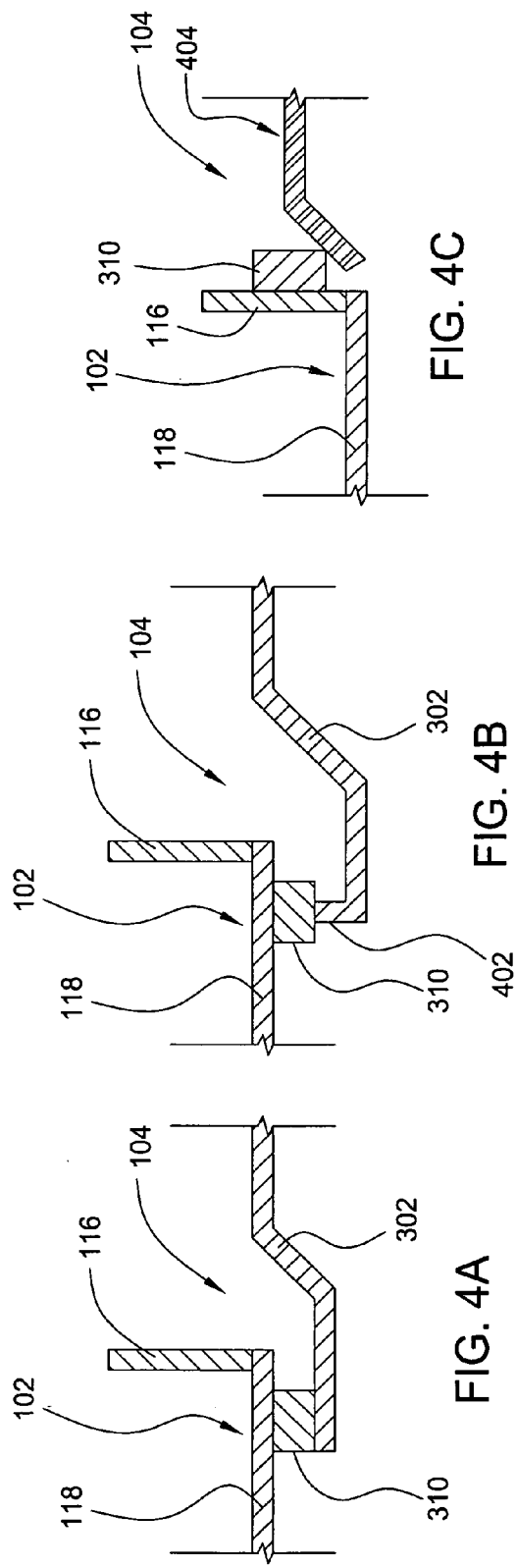
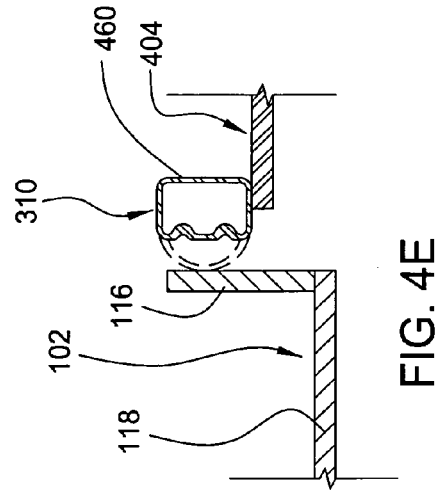
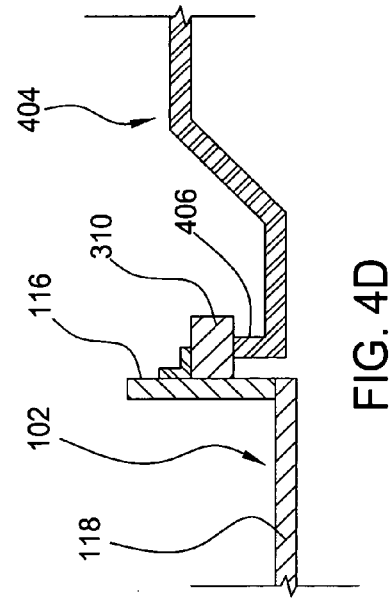
FIG. 4A  FIG. 4B  FIG. 4C  FIG. 4D  FIG. 4E

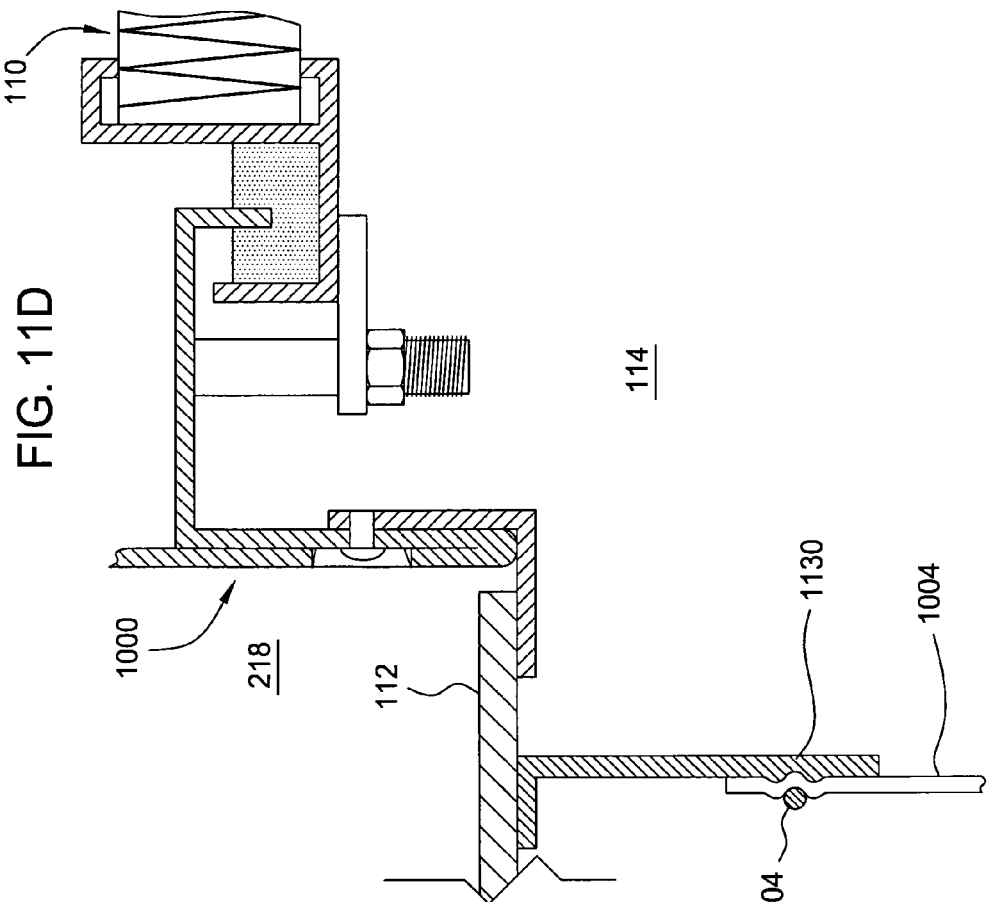
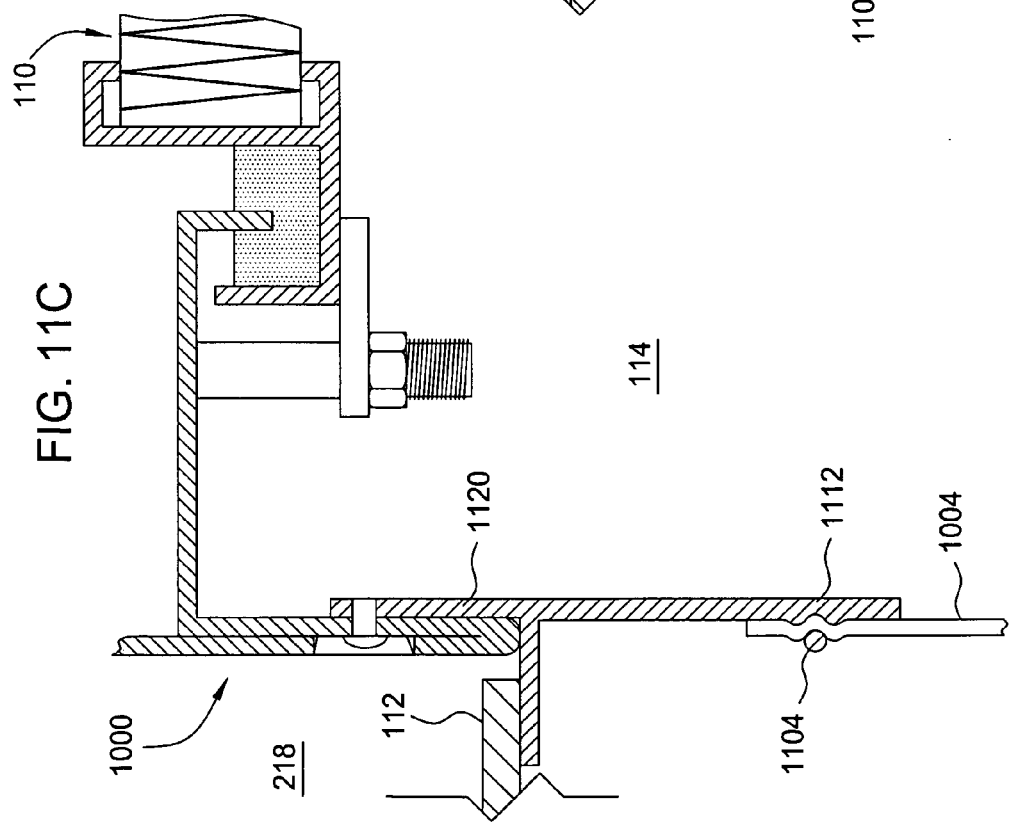

US 7,210,363 B2

SCAN TESTABLE FILTER HOUSING ASSEMBLY FOR EXHAUST APPLICATIONS

CROSS-REFERENCE TO RELATED APPLICATIONS

This application claims the benefit of U.S. Patent Provisional Application Ser. No. 60/598,627, filed Aug. 4, 2004, which is herein incorporated by reference in its entirety.

BACKGROUND OF THE DISCLOSURE

1. Field of the Invention

The embodiments of the present invention relate generally to a filter housing assembly for exhaust applications and leak testing thereof.

2. Background of the Invention

Cleanrooms are utilized in many industries for contamination control and to improve product yields. A plurality of filters, typically mounted in the ceiling of the cleanroom, are configured to remove particulates from air entering and/or exhausted the cleanroom at a predetermined efficiency selected based upon the cleanliness requirements of the activities performed in the cleanroom. As particulates load the filtration media disposed in the filter, the airflow through the filter decreases as the pressure drop across the filter increases. Once the filter reaches a critical pressure drop, the filter is typically replaced.

On other applications, replacement of filters is scheduled based on time or processes performed within the cleanroom. For example, in many pharmaceutical and biotech cleanrooms, periodic replacement of filters is required to meet regulatory or owner specifications. To facilitate efficient replacement of the filter, a ducted supply hood is typically mounted in the cleanroom ceiling in which the filter may be readily removed and replaced from the cleanroom side of the ceiling.

In many applications, the installed replacement filter must be leak tested before normal cleanroom activities may commence. In order to perform a statistically valid leak test within a reasonable time period, an aerosol challenge is introduced into the hood upstream of the filter. However, in filters used in exhaust applications, the downstream side of the filter is above the cleanroom ceiling, and is often not accessible. Moreover, introducing aerosol within the cleanroom to challenge a filter is also undesirable.

Therefore, there is a need for a ducted hood, i.e., a housing assembly, and a technique to facilitate testing of filters used in exhaust applications.

SUMMARY OF THE INVENTION

A filter housing assembly for exhaust applications and method of testing the same is provided. In one embodiment, the filter housing assembly includes a housing having a filter receiving aperture, a first air flow port configured to couple the housing to an exhaust system and a second air flow port sized to deliver a flow capable of providing at least 75 feet per minute of air flow through the filter receiving aperture. A filter element is sealingly disposed in the filter receiving aperture of the housing. A cap is provided that operably seals the second air flow port when not in use.

In another embodiment, a method for testing a filter housing assembly for exhaust applications is provided. The method includes providing air through a filter element disposed in the housing in a direction opposite an operational air flow direction, leak testing the filter element from a roomside of the filter element, and, flowing air through the filter element after leak testing in the operational direction.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

FIGS. 4A–E are various embodiments of a damper seal;

FIGS. 11A–D are a partial sectional views of various embodiments of a filter housing assembly interfaced with a bag with gloves.

To facilitate understanding, identical reference numerals have been used, where possible, to designate identical elements that are common to the figures.

DETAILED DESCRIPTION

Figure 1:
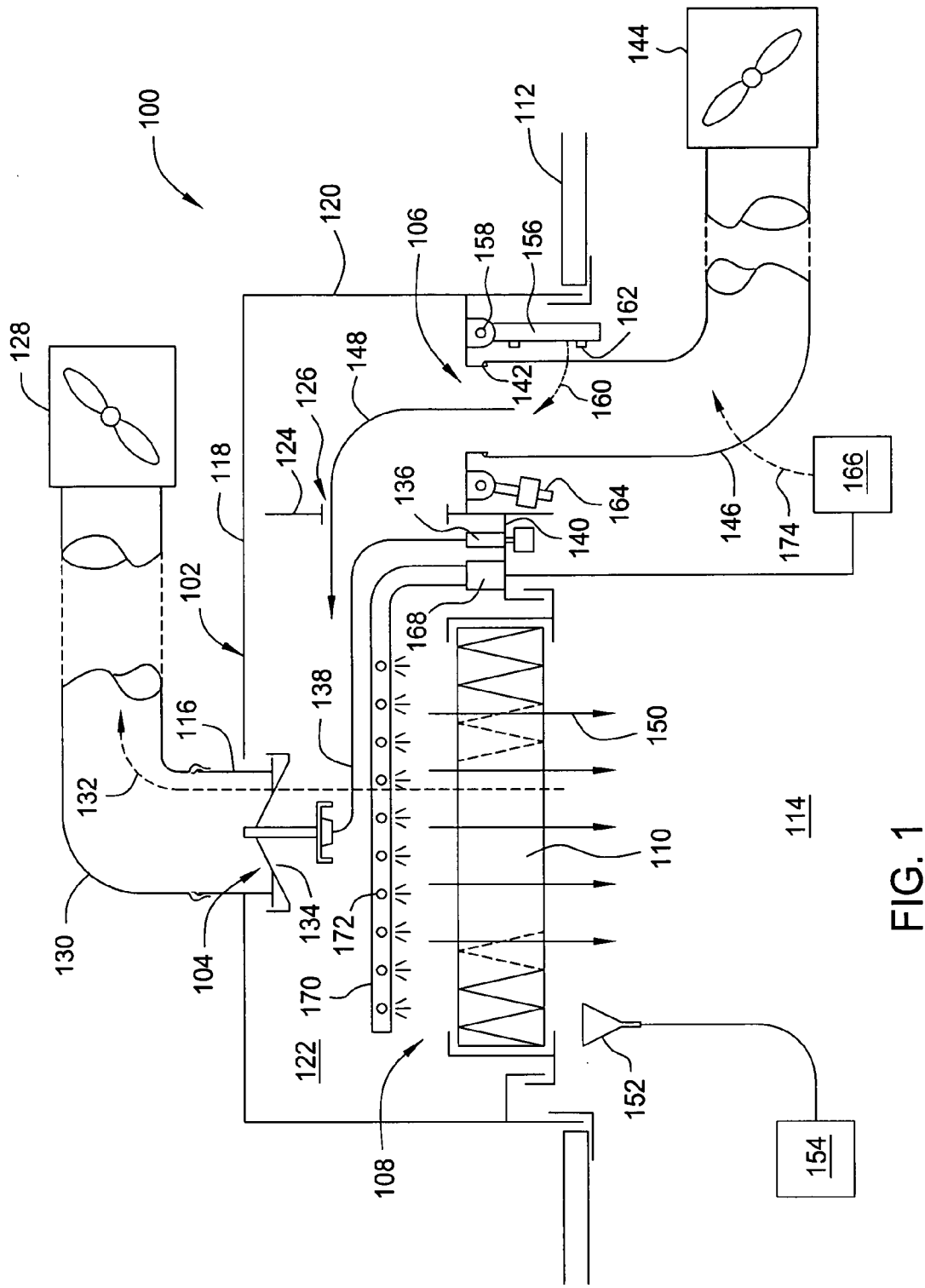
FIG. 1 depicts a simplified, partial sectional view of one embodiment of a filter housing assembly for exhaust applications configured for reliable leak testing.

FIG. 1 depicts one embodiment of a filter housing assembly suitable for use in exhaust applications and having the capability to be scan tested in the reverse flow direction. The filter housing 100 includes a housing 102 configured to retain a filter element 110 in a structure, such as a ceiling 112 of a cleanroom 114, mini environment or other suitable location. The housing 102 includes a first air flow port 104, a second air flow port 106 and a filter receiving aperture 108. In the embodiment depicted in FIG. 1, the first air flow port 104 is disposed opposite the filter receiving aperture 108. The second air flow port 106 is generally sized to deliver a flow, which when routed to the filter receiving aperture 108, is suitable for filter leak testing. Thus, the size of the second air flow port 106 is related to the filter receiving aperture 108 and performance properties of the filter element 110, and in one embodiment, second air flow port 106 is capable of providing at least 75 feet per minute of air flow through the filter receiving aperture 108. The first air flow port 104 is similarly sized to pull least 75 feet per minute of air flow through the filter element 110 to exhaust the cleanroom 114.

The housing 102 is typically fabricated from a metal, plastic or other suitable material and includes a back plate 118 and side walls 120 which define an interior volume 122. The interior volume may be optionally segmented, such as by an interior wall 124 to separate the second air flow port 106 from the filter receiving aperture 104. An internal port 126 is defined through the interior wall 124 to allow communication between the second air flow port and the region of the interior volume 122 defined between the first air flow port 104 and the filter receiving aperture 108.

The first air flow port 104 is generally defined by a collar 116 formed in or coupled to the back plate 118. The collar facilitates coupling the filter housing assembly 100 to an exhaust system 128 via a duct 130. In normal operation, air flow is drawn through the filter element 110 into the interior volume 122 and out through the first air flow port 104 by the exhaust system 128 as shown by phantom arrow 132.

Air flow through the first air flow port 104 is controlled by a damper 134. The damper 134 may be actuated to shut off and/or regulate the flow through the first air flow port 104. In the embodiment depicted in FIG. 1, the damper 134 is coupled to an adjustment mechanism 136 via a power transmission device such as a rotary cable 138. The adjustment mechanism 136 is desirable through a flange 140 of the filter housing 102 from the cleanroom side of the filter housing assembly 100. As such, adjustment mechanisms are commonly known in the art, the operation of which will be omitted for the sake of brevity.

The second air flow port 106 is formed through the housing 102 laterally offset from the filter receiving aperture 108. The second air flow port 106 is typically defined through a collar 142 which facilitates coupling a blower 144 to the housing 102 via a duct 146. During testing of the filter element 110 with the damper 134 in the closed position, the blower 144 provides an air flow, as shown by arrows 148, into the housing 102 and through the filter element 110 in a reverse flow direction into the cleanroom 114, as shown by arrows 150. With the air flow provided by the blower 144 flowing through the filter element 110 into the cleanroom 114, the filter element 110 may be scan tested using a probe 152 and tester 154 pursuant to IES or other testing protocol. This convention for scan testing the filter element 110 will enable detection of pin hole leaks in the filter element using the tester 154, such as a photometer or particle counter.

During normal exhaust operations of the filter housing assembly 100, the second air flow port 106 is sealed. In the embodiment depicted in FIG. 1, a lid 156 is coupled to the housing 102 via a hinge 158 and may be rotated, as shown by phantom arrow 160, to cover the collar 142. A gasket 162 is typically disposed on the underside of the lid 156 and sealingly engages the collar 142 as the lid 156 is closed. A locking mechanism 164, such as a knob, disposed on a threaded shaft, may be operably engaged with the lid to compress the gasket 162 against the collar 142 to ensure an airtight seal. To facilitate a statistically valid test of the filter element 110, an aerosol generator 166 is typically utilized to challenge within the interior volume 122 of the filter housing assembly 100. In the embodiment depicted in FIG. 1, the aerosol generator 166 is coupled to a penetration 168 formed through the flange 140 of the housing 102 and is coupled to a tube 170 disposed in the interior volume of the housing 102. The tube includes a plurality of holes 172 through which the aerosol provided by the generator 166 may be uniformly distributed in the internal volume 120 to provide a uniform challenge of aerosol across the filter element 110. Alternatively, the aerosol generator 166 may be coupled to the duct 146 delivering air through the second air flow port 106, as shown by phantom line 174.

Figure 2A:
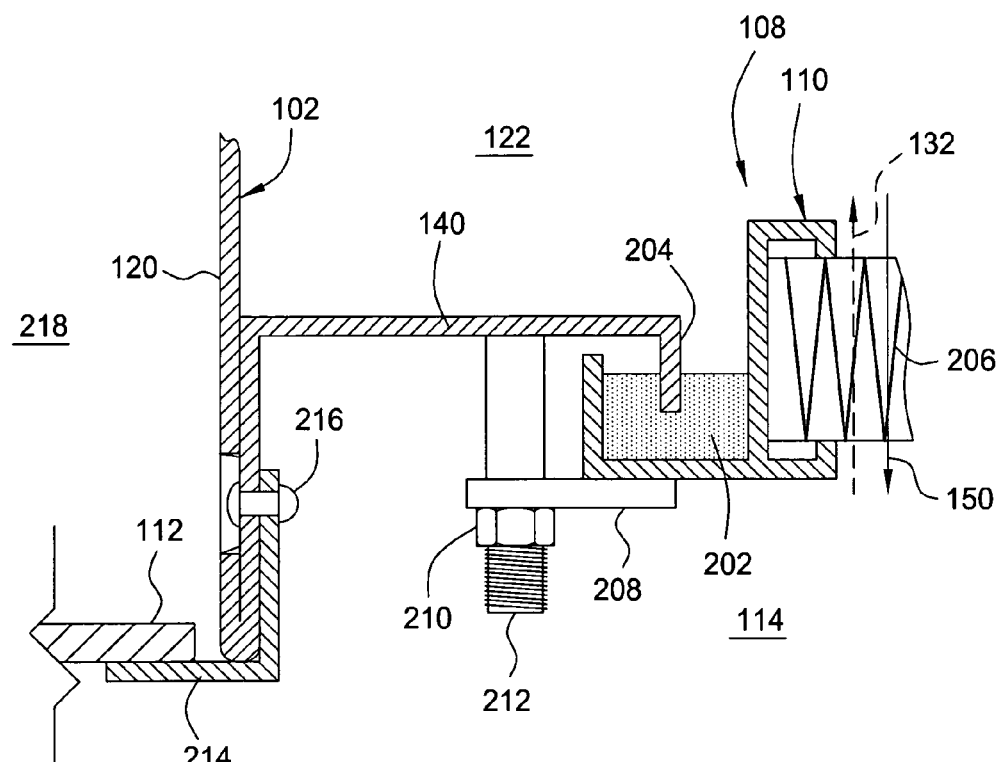
FIGS. 2A–B are partial sectional views of embodiments of a filter element to housing interface.
Figure 2B:
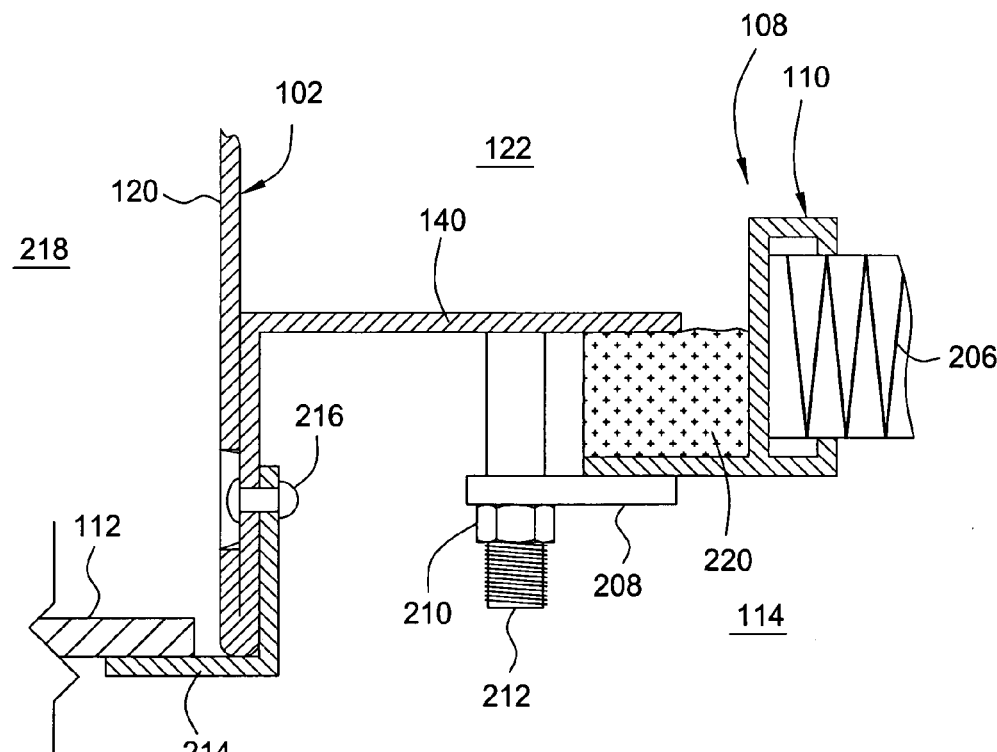

FIGS. 2A and 2B depict two embodiments of an interface between the filter element 110 and the housing 102. In the embodiment depicted in FIG. 2A, the filter element 110 includes a fluid seal 202 which sealingly engages with a knife edge 204 extending from the flange 140 of the housing 102. The fluid seal 202 and knife edge 204 interface extends completely around the filter receiving aperture 108, such that flow through the filter receiving aperture 108 between the interior volume 122 of the filter housing 102 and the cleanroom 114 is forced through the filter media 206 of the filter element 110, as shown by arrows 150, 132, respective of the flow direction.

The filter element 110 is retained to the housing 102 by a pawl tab 208 which may be rotated to engage the filter element 110 after installation into the housing 102. In the embodiment depicted in FIG. 2A the pawl tab 208 is retained in place by a nut 210 tightened on a threaded member 212 extending from the flange 140.

Also depicted in FIG. 2A, a trim ring 214 may be utilized to cover the gap between the ceiling 112 and the side walls 120 of the housing 102. The trim ring 214 is typically coupled to the housing via a fastener 216, such as a rivet or screw. Typically, the trim ring 214 is caulked to the ceiling 112 and the housing 202 to prevent air transmission between the interstitial space 218 above the ceiling 112 and the cleanroom 114.

Alternatively, the filter element 110 may be sealed to the flange 140 utilizing a gasket 220, as shown in FIG. 2B. It is also contemplated that the filter element 110 may be sealed to the housing 102 in many other configurations.

Figure 3:
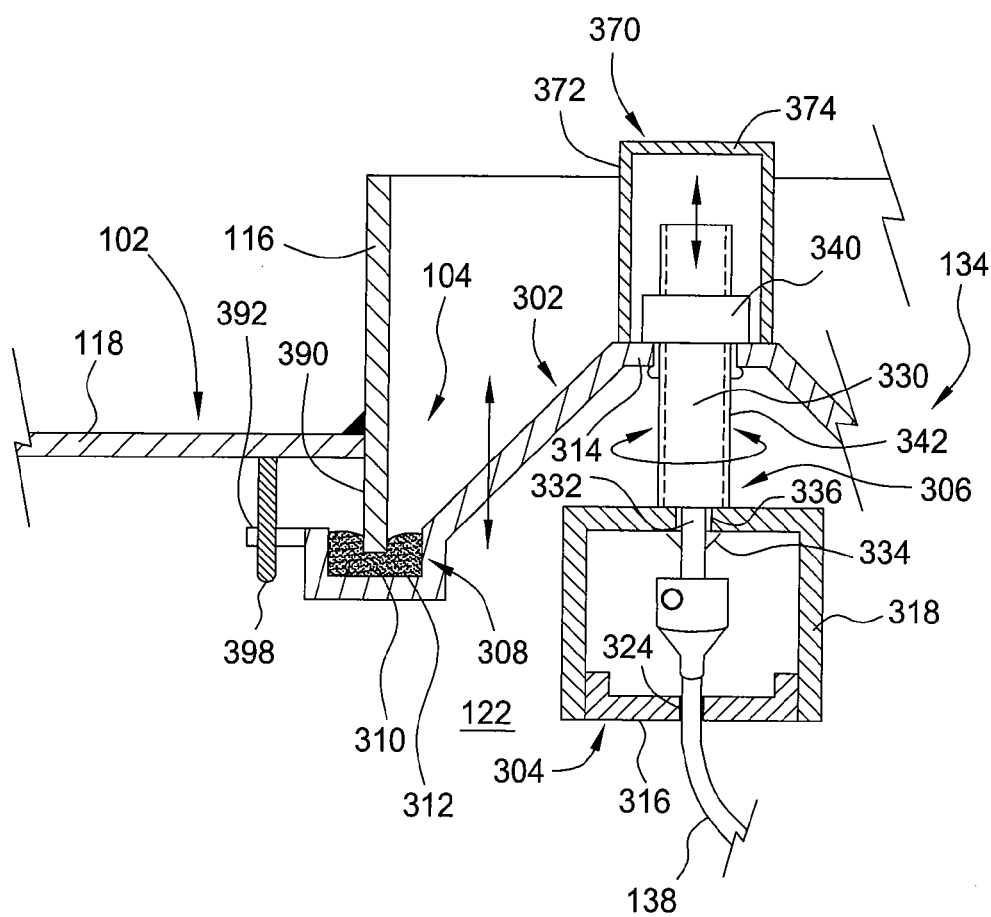
FIG. 3 is a partial sectional view of one embodiment of a damper assembly of the filter housing assembly of FIG. 1.

FIG. 3 is a partial sectional view of the housing assembly 100 illustrating one embodiment of the damper 134. The damper 134 includes a seal member 302 coupled to support member 304 by an adjustment mechanism 136. A sealing element 310 is disposed between the housing 102 and the seal member 302. The adjustment mechanism 136 is adapted to move the seal member 302 between a first position that allows air (or other gas) into the internal volume 122 of the housing 102 and a second position that prevents flow through the first air flow port 104 of the housing 102. Accordingly, the adjustment mechanism 136 may be utilized to selectively control the spacing between the housing 102 and the seal member 302, thereby controlling the flow of air through the first air flow port 104 and ultimately through the filter element 110.

The seal member 302 is fabricated from a material non-permeable to air at pressure differentials typically encountered in ventilation systems. Materials suitable for fabricating the seal member include metals, such as aluminum or stainless steel, or other materials such as plastic, or glass reinforced plastic, among others. The seal member 302 is generally configured with a plan area larger than the diameter of the first air flow port 104. The seal member 302 may have polygonal, disk or other plan form.

The horizontal sectional profile of the seal member 302 may vary to provide a predetermined distribution of air flow and/or pressure within the internal volume 122 of the housing 102. The seal member 302 may have a flat, conical, dome, bowl, convex, concave, spherical or other sectional shape. In the embodiment depicted in FIG. 3, the seal member 302 has a truncated cone shape.

The seal member 302 generally includes an outer portion 308 and a center portion 314. The outer portion 308 supports the sealing element 310 on a side of the seal member 302 facing the first air flow port 104. In the embodiment depicted in FIG. 3, a channel 312 is formed in the outer portion 308 of the seal member 302 to position the sealing element 310 in a predefined position relative to the first air flow port 104. For example, the channel 312 is substantially centered relative to a lip 390 that extends into the internal volume 122 of the housing 102 so that the force per unit area of the lip 390 against the sealing element 310 ensures a bubble-tight seal of the first air flow port 104, thereby preventing flow into the housing 102.

The sealing element 310 may be any material suitable for providing a bubble-tight seal between the seal member 302 and housing 102. Examples of suitable sealing elements 310 include gaskets, gels and bladders, among others. Examples of suitable gasket materials include neoprene, foamed urethane, silicone, butyl, viton and the like. Examples of suitable gel materials include polymeric gel, polymeric thermoset gel, polymeric thermoplastic elastomer gel, silicon gel, polyurethane gel, and the like. In the embodiment depicted in FIG. 3, the sealing element is a polyurethane gel that allows penetration of the lip 390, thereby ensuring a bubble-tight seal.

It is contemplated that the sealing element 310 may be sealingly engaged by the housing 102 and seal member 302 in other configurations. For example, the sealing element 310 may be coupled to at least one of the housing 102 and seal member 302, and provide a bubble-tight seal without engaging a lip, as shown in FIG. 4A. In another example, the sealing element 310 may be coupled to the housing 102 and engaged by a lip 402 extending from seal member 302, as shown in FIG. 4B. In yet another example, the sealing element 310 may be coupled to the housing 102 within the collar 116 and engaged by a seal member 404 configured with a diameter less than the first air flow port 104, as shown in FIG. 4C. In still another example, the sealing element 310 may be engaged by a lip 406 extending from seal member 404, as shown in FIG. 4D. In another embodiment, the sealing member 404 may be coupled to the housing 102 within the collar 116 and of a diameter less than the inside diameter of the collar 116. An inflatable gasket or bladder 460, coupled to at least one of the seal member 404 or collar 116, may be inflated and urged between the inside of the collar 116 and the seal member 404 as the seal element 310 to provide a bubble-tight seal, as shown in FIG. 4E.

The bubble-tight seal prevents air borne particles and contaminants from entering the cleanroom. The bubble-tight seal may be tested using pressure decay techniques, for example, as described in ASME N509-1989, Paragraph 5.9.7.3, which states that the damper seal shall be bubble tight when tested in the closed position at 10 inches water gage. Alternative seal criteria may include testing the bubble tight seal at a pressure between about 3 to 15 inches water gage. It is contemplated that alternative seal test criteria may be utilized.

Referring back to FIG. 3, the support member 304 includes a cross bar 316 and a mounting plate 318. The cross bar 316 is coupled to opposite sidewalls 120 of the housing 102. The mounting plate 318 is coupled to the center of the cross bar 316 and provides an anchor for the adjustment mechanism 136. In the embodiment depicted in FIG. 3, both the cross bar 316 and the mounting plate 318 have a "U" shaped cross section to limit deflection.

Figure 5:
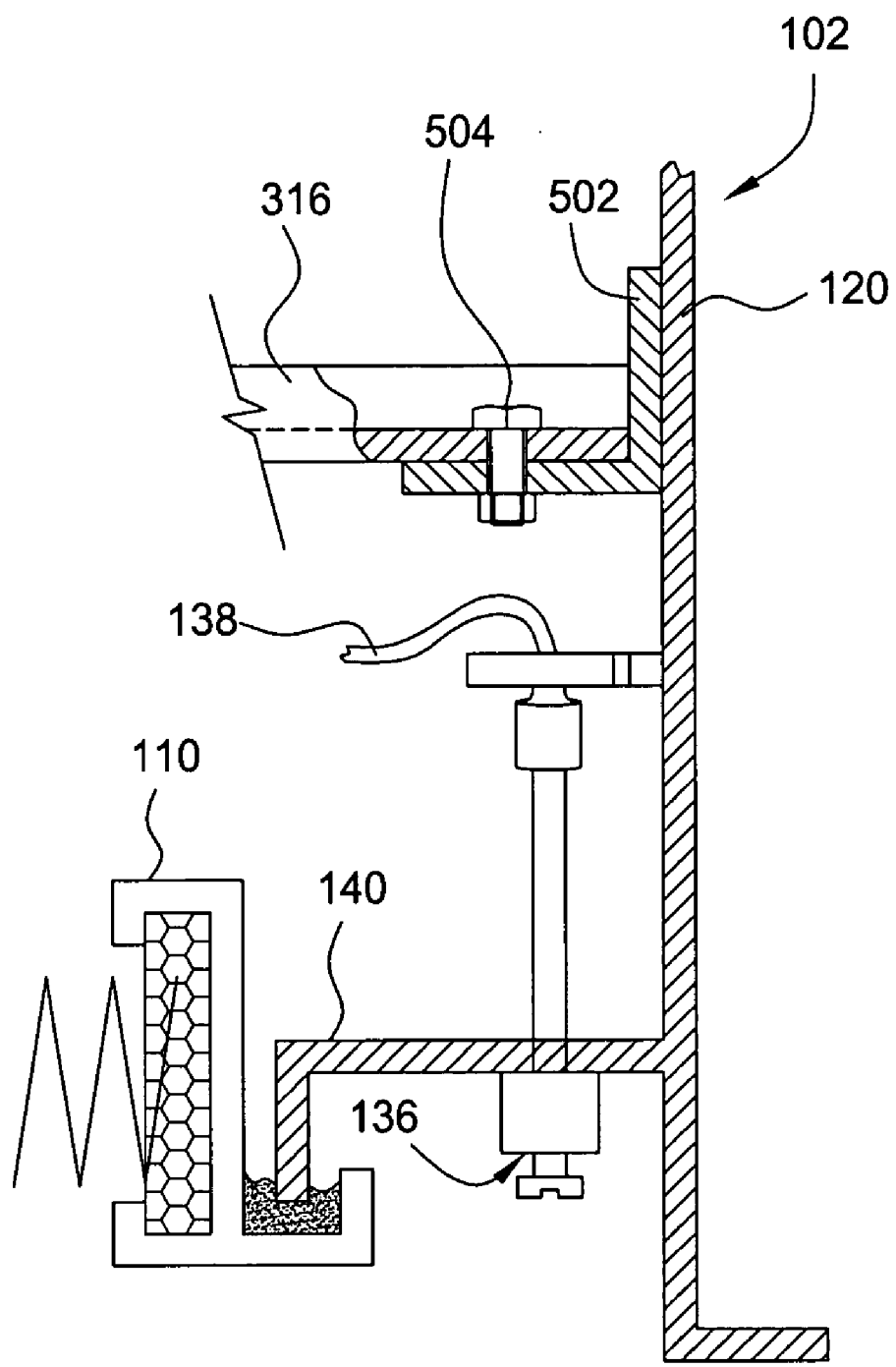
FIG. 5 is a partial sectional view of the filter housing assembly showing a damper adjustment mechanism.

Referring additionally to FIG. 5, the end of the cross bar 316 is coupled to a tab 502 that extends into the housing 102 from the sidewall 120. The opposite end of the cross bar 316 (not shown) is similarly attached to the opposite sidewall 120. The tab 502 may be coupled to the sidewall 120 by any method that does not generate a leak path into (or out of) the housing 102. In the embodiment depicted in FIG. 5, the tab 502 is welded to the housing 102. The cross bar 316 may be coupled to the tab 502 by any suitable method, such as welding, riveting fastening and the like. In the embodiment depicted in FIG. 5, the tab 502 is coupled to the cross bar 316 by a fastener 504, such as a machine screw and locknut, or rivet. Alternatively, the cross bar 316 may be coupled directly to the sidewall 120 and/or backplate 118 by any method that does not generate a leak path into (or out on the housing 102.

The adjustment mechanism 136 is generally suitable to control the spacing between the seal member 302 and the first air flow port 104. Suitable adjustment mechanisms 136 include lead screws, ball screws, acme screws, linear actuators, electric motors, fluid cylinders, and mechanical linkages among others. In one embodiment, the adjustment mechanism 136 includes a lead screw 330, a drive nut 340 and the rotary cable 138. The rotary cable 138 is coupled to a shaft 332 extending from the lead screw 330 opposite the drive nut 340 and is utilized to rotate the lead screw 330, thereby controlling the position of the drive nut 340 along the lead screw 330.

The lead screw 330 is axially retained by and may rotate relative to the support member 304. In the embodiment depicted in FIG. 3, the shaft 332 of the lead screw 330 is disposed through a hole 336 formed in the top of the mounting plate 318. A threaded portion 342 of the lead screw 330 which engages the drive nut 340 has a larger diameter than the hole 336, thereby preventing the lead screw 330 from sliding through the hole 336 of the mounting plate 318. A retaining ring 334 may be disposed on the shaft 332 to capture the lead screw 330 to the mounting plate 318, thereby allowing the shaft 330 to rotate freely within the hole 336 without becoming disengaged from the support member 304. The rotary cable 138 is coupled to the shaft 332 and is routed to the adjustment mechanism 136 as shown in FIGS. 2–3B.

Figure 8:
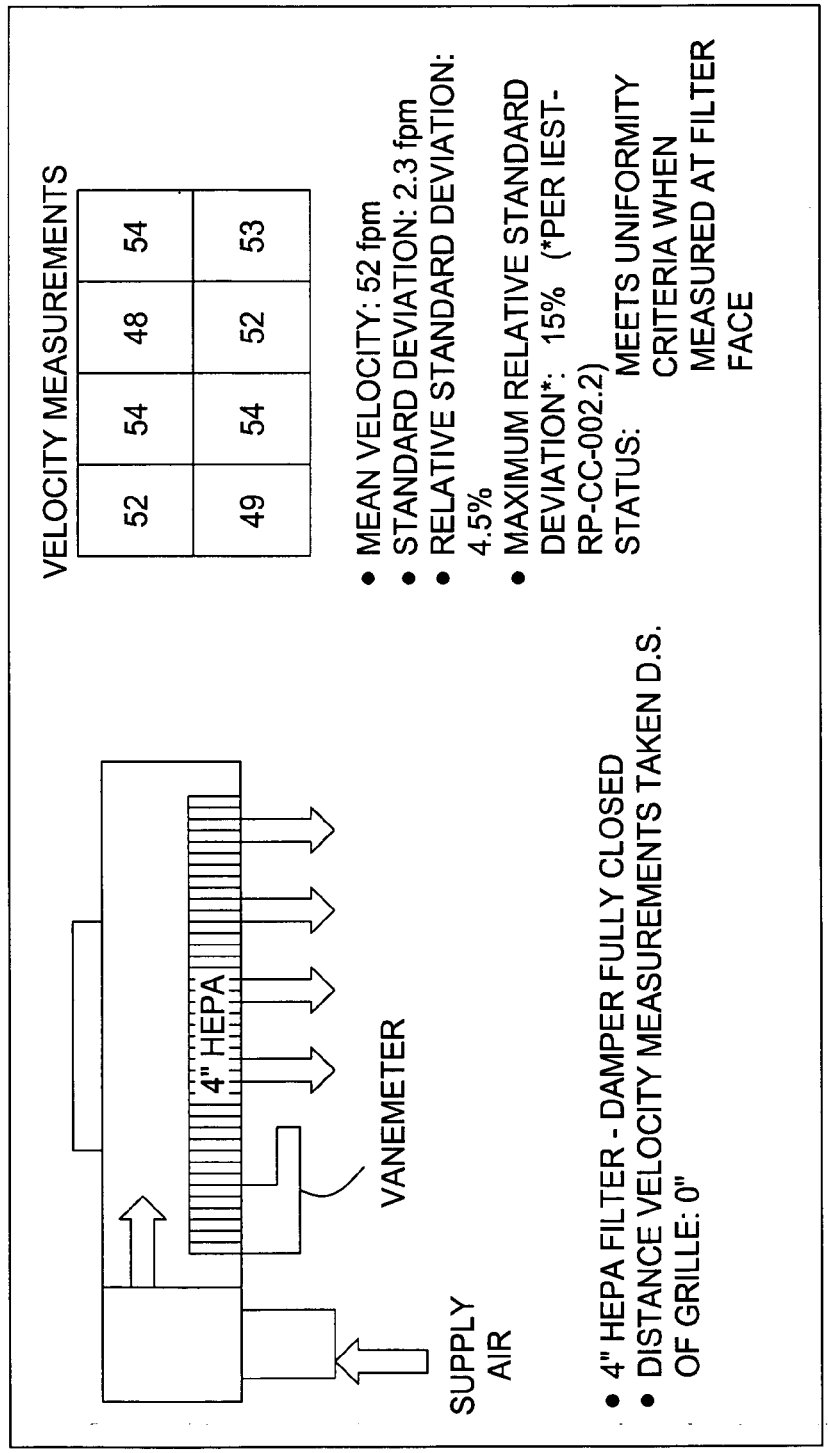

The drive nut 340 is coupled to the seal member 302 and is engaged by the lead screw 330. The drive nut 340 is coupled to the center portion 314 of the seal member 302. The drive nut 340 may be a weld nut, clinch nut, press nut or hole threaded into the seal member 302. The rotation of the seal member 302 is prevented by at least one pin 398 extending from the housing 102 and engaging a hole or slot 392 formed in the seal member 302 radially outward of the sealing element 310. It is contemplated that the seal member 302 may be restrained from rotation by a tab or other geometry configured to engage the support member 304 in a manner that prevents rotation of the disk as the lead screw 330 is rotated. It is also contemplated that the seal member 302 may be restrained from rotation by anti-rotation geometry incorporated into the drive nut 340 and the lead screw 330. Thus, as the lead screw 330 is rotated, the restrained seal member 302 is moved between a second position sealing the first air flow port 104 (as shown in FIG. 3) and a first position spacing the sealing member 310 from the housing 102 (as shown in FIG. 8), thereby selectively regulating flow through the first air flow port 104 and into the interior volume 122 of the housing 102.

To prevent leakage into the housing 102 between the drive nut 340 and the lead screw 330, a cover 370 is sealingly coupled to the seal member 302 opposite the cross bar 316. The cover 370 generally prevents air from passing through the interface between adjustment mechanism 136 and the seal member 302 while allowing adequate movement of the lead screw 330.

In the embodiment depicted in FIG. 3, the cover 370 is a cylinder 372 having a first end sealingly coupled to the seal member 302 and a second end sealed by a cap 374. The cylinder 372 has a predetermined length that allows the lead screw 330 to extend into the cylinder 372 to a depth unimpeded by the cap 374 to allow sufficient travel of the drive nut 340 along lead screw 330 in order to provide a predefined flow through the gap created between the seal member 302 and the housing 102.

In operation, the second air flow port 106, which will be accessible from the cleanroom 114, is opened and coupled to the blower 144. The internal volume 122 of the housing 102 is then provided with a mixture of air and aerosol from the blower 144 and aerosol generator 166. With the bubble-tight damper 134 closing the first air flow port 104, the aerosol-laden air injected into the interior volume 122 of the housing 102 is forced through the filter element 110 in a reverse direction, as shown by arrows 134. The flow rate of the air into the housing 102 is consistent with the recommendations of IEST-RP-CC034.1 and IEST-RP-CC-002.2. The aerosol-laden air will pass through the filter element 110 and into the cleanroom 114, as it would if the filter housing assembly 100 was in a supply air application. A technician may then scan test the filter element 110 from the cleanroom 114, as would be normally done in a supply air application. Once the integrity of the filter element 110 is verified, the technician would seal the second air flow port 106 and open the bubble-tight damper in the hood to return it to the exhaust air application.

Test results of this embodiment are enclosed using a modified PHARMASEAL® filter housing assembly. The modified PHARMASEAL® filter housing assembly was tested with a 4" HEPA filter in place, and the results were compared to the recommendations of IEST-RP-CC-002.2 and IEST-RP-CC-034. 1.

IEST-RP-CC0002.2 suggests that the typical velocity is 90 fpm +/−10 fpm. Although this is generally accepted velocity for testing at validation of filters at the factory, it is not uncommon that filters are subjected to both higher and lower airflows when installed in the field. Therefore, tests were conducted at three flowrates in order to evaluate the performance of this hood while operating at not only the recommended flowrate, but also at substantially higher and lower flowrates at which the systems may be operated in actual installations.

Figure 6:
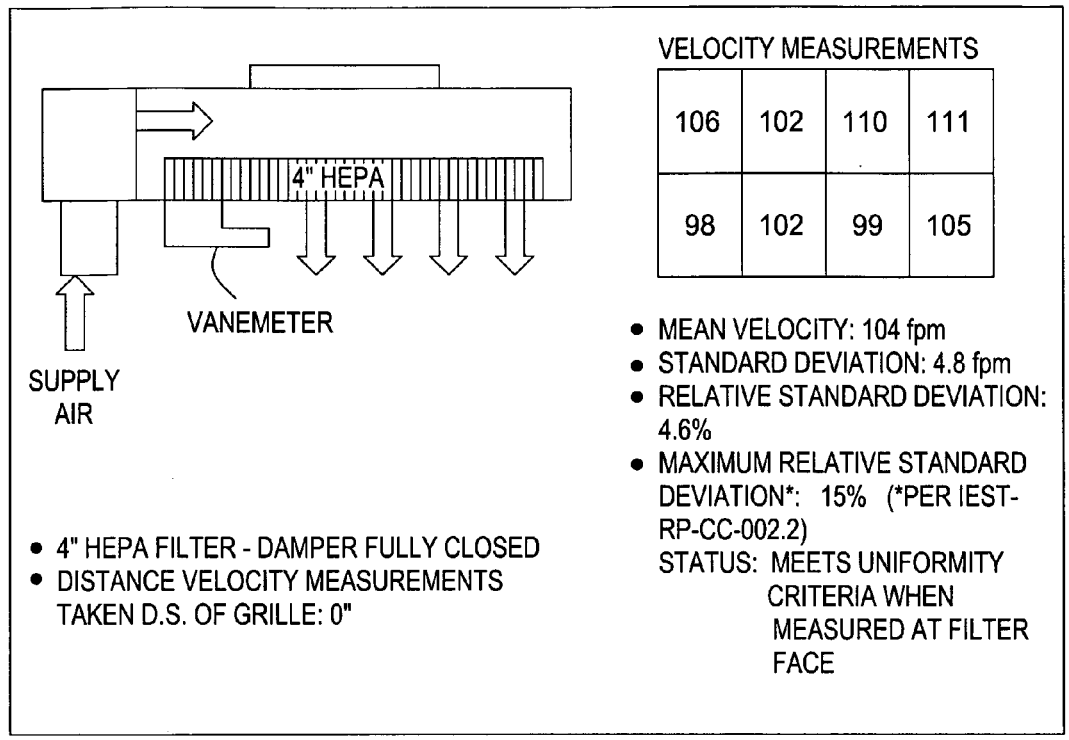
FIGS. 6–8 are results of airflow uniformity tests.
Figure 7:
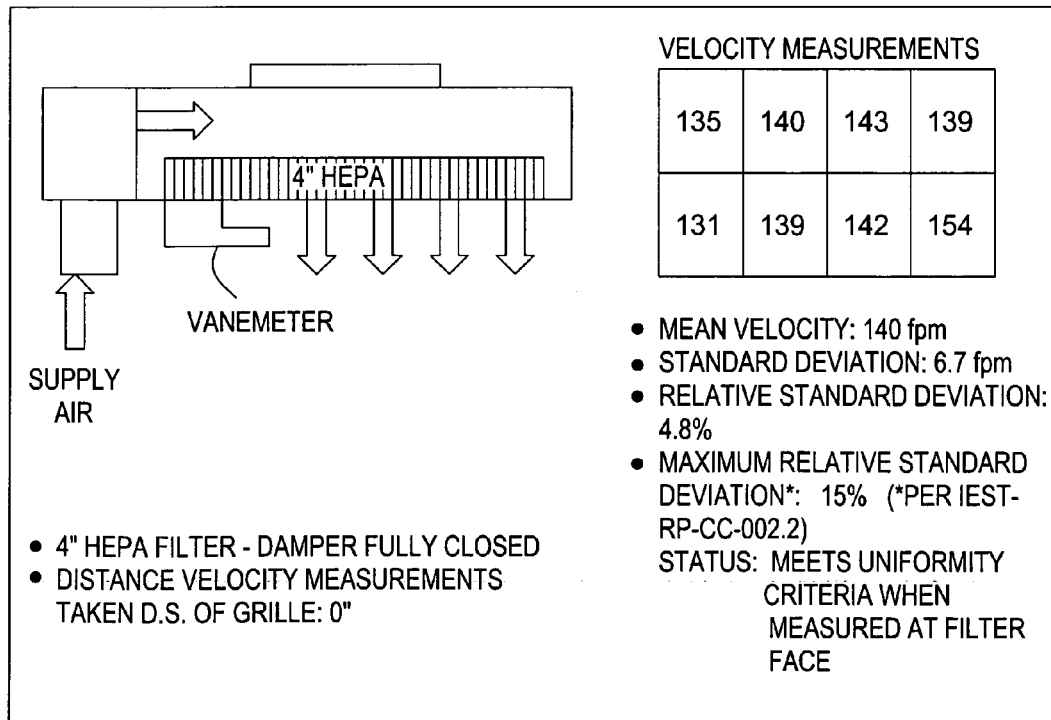

IEST-RP-CC-002.2 recommends checking the airflow uniformity in a plane parallel to and 12" (or as specified) downstream from the face of the grille. The filter and hoods described in IEST-RP-CC-002.2 are supply systems that are installed in cleanrooms. In these applications, the end user is generally concerned about airflow uniformity over the process areas and process equipment. Therefore, measurement of the airflow uniformity is taken on a plane at some distance downstream of the filter or grille, in order to give the end user reassurance that there will be uniform airflow over the process area. In the case of this PHARMASEAL, airflow uniformity is not important from the standpoint of ensuring uniform airflow over process equipment (since it's designed for an exhaust application). However, airflow uniformity is important from the standpoint that we want to ensure that the entire filter is adequately challenged with aerosol during the scan testing process. If there was very high airflow on one end of the filter versus the opposite end of the filter, it could affect the scan test results. Since scan testing is generally conducted within 1 inch of the face of the media, it was assumed that airflow uniformity measured at the filter face would provide more meaningful results for this PHARMASEAL configuration than if measured in a plane 12 inches from the filter face. The results of the airflow uniformity tests are summarized in FIGS. 6–8.

IEST-RP-CC-002.2, Section 6.1.6, Acceptance states "The customer should specify average measured clean-air velocity, typically . . . 90+/−10 ft/min. The maximum relative standard deviation is typically 15% when using an averaging pitot array." Section 6.1.3 Procedure states "Measure the air velocity in a plane parallel to and . . . 12 in. downstream . . ."

The methods and procedures used in the testing were consistent with the recommendations of IEST-RP-CC-002.2 with the exception that a vane anemometer was used as opposed to an averaging pitot array. As tested, the hood meets the recommendations of IEST not only at 104 fpm, but also at 52 fpm and 140 fpm. It is expected that although an averaging pitot array may give more accurate velocity measurements, the relative uniformity between various locations would be very similar, whether measured with the pitot array or vanemeter. Therefore, it is concluded that the prototype PHARMASEAL performs within the recommendations of IEST-RP-CC-002.2 for airflow uniformity and that further testing regarding aerosol uniformity are warranted.

Results of the aerosol sampling are shown in Tables 1-3 below, including the suggested reporting per IEST-RP-CC034.1.

TABLE 1

Results of aerosol uniformity testing at 104 fpm face velocity

| Location | Photometer Reading | Relative Std. Deviation = {(avg value-location value)/avg value} | Acceptance Criteria for Relative Std. Deviation |
|---|---|---|---|
| Sampling port | Set to 50% reading on photometer | not req'd | <50% |
| 1 | 49% | 1.03% | <50% |
| 2 | 49% | 1.03% | <50% |
| 3 | 47% | 3.09% | <50% |
| 4 | 48% | 1.03% | <50% |
| 5 | 49% | 1.03% | <50% |
| 6 | 49% | 1.03% | <50% |
| 7 | 49% | 1.03% | <50% |
| 8 | 49% | 1.03% | <50% |
| 9 | 48% | 1.03% | <50% |
| 10 | 48% | 1.03% | <50% |
| Sampling Port | 49% | not req'd | <50% |

| Parameter | Result | Acceptance Criteria |
|---|---|---|
| Avg. of upstream sampling port at beginning and end of test | 48.5% | not req'd |
| Avg. of locations 1–10 | 48.5% | not req'd |
| Std. Deviation of locations 1–10 | 0.71 | not req'd |
| Relative Std. Deviation = (Std. Deviation/Avg) | 1.5% | Less than 20% |
| Ratio of avg. of upstream reading to avg. of locations 1–10 | 1.00 | 0.75–1.25 |

TABLE 2

Results of aerosol uniformity testing at 140 fpm face velocity

| Location | Photometer Reading | Relative Std. Deviation = {(avg value-location value)/avg value} | Acceptance Criteria for Relative Std. Deviation |
|---|---|---|---|
| Sampling port | Set to 50% reading on photometer | not req'd | <50% |
| 1 | 48% | 2.04% | <50% |
| 2 | 47% | 4.08% | <50% |
| 3 | 49% | 0% | <50% |
| 4 | 50% | 2.04% | <50% |
| 5 | 49% | 0% | <50% |
| 6 | 49% | 0% | <50% |
| 7 | 49% | 0% | <50% |

TABLE 2-continued

Results of aerosol uniformity testing at 140 fpm face velocity

| | | | |
|---|---|---|---|
| 8 | 50% | 2.04% | <50% |
| 9 | 49% | 0% | <50% |
| 10 | 50% | 2.04% | <50% |
| Sampling Port | 49% | not req'd | <50% |

| Parameter | Result | Acceptance Criteria |
|---|---|---|
| Avg. of upstream sampling port at beginning and end of test | 49.5% | not req'd |
| Avg. of locations 1–10 | 49.0% | not req'd |
| Std. Deviation of locations 1–10 | 0.94 | not req'd |
| Relative Std. Deviation = (Std. Deviation/Avg) | 1.9% | Less than 20% |
| Ratio of avg. of upstream reading to avg. of locations 1–10 | 1.01 | 0.75–1.25 |

TABLE 3

Results of aerosol uniformity testing at 52 fpm face velocity

| Location | Photometer Reading | Relative Std. Deviation = {(avg value-location value)/avg value} | Acceptance Criteria for Relative Std. Deviation |
|---|---|---|---|
| Sampling port | Set to 50% reading on photometer | not req'd | <50% |
| 1 | 49% | 3.16% | <50% |
| 2 | 49% | 3.16% | <50% |
| 3 | 50% | 1.19% | <50% |
| 4 | 50% | 1.19% | <50% |
| 5 | 51% | 0.79% | <50% |
| 6 | 52% | 2.77% | <50% |
| 7 | 52% | 2.77% | <50% |
| 8 | 49% | 3.16% | <50% |
| 9 | 52% | 2.77% | <50% |
| 10 | 52% | 2.77% | <50% |
| Sampling Port | 50% | not req'd | <50% |

| Parameter | Result | Acceptance Criteria |
|---|---|---|
| Avg. of upstream sampling port at beginning and end of test | 50% | not req'd |
| Avg. of locations 1–10 | 50.6% | not req'd |
| Std. Deviation of locations 1–10 | 1.35 | not req'd |
| Relative Std. Deviation = (Std. Deviation/Avg) | 2.7% | Less than 20% |
| Ratio of avg. of upstream reading to avg. of locations 1–10 | 1.00 | 0.75–1.25 |

IEST-RP-CC-034.1 Section 6.1.1 d), suggests an acceptance criteria of a elative standard deviation less than 20%, a maximum relative deviation of any single point 50%, and a ratio of concentration at the representative upstream sample port to the average concentration between 0.75 and 1.25. As shown in the Results, Tables 1-3, the relative standard deviation at each velocity is well within the maximum of 20%, the maximum relative deviation at each velocity for any single point is well within the maximum of 50%, and at each velocity, the ratio of average upstream reading to the average of the locations 1–10 is well within 0.75–1.25. At each velocity tested (104 fpm, 140 fpm and 52 fpm) the aerosol uniformity meets all of the recommendations of IEST-RP-CC-034.1. Thus, the test results indicate that the filter in the filter housing assembly 100 was scannable consistent with IEST recommendations, and meets IEST recommendations for both velocity and scan leak testing.

Figure 9:
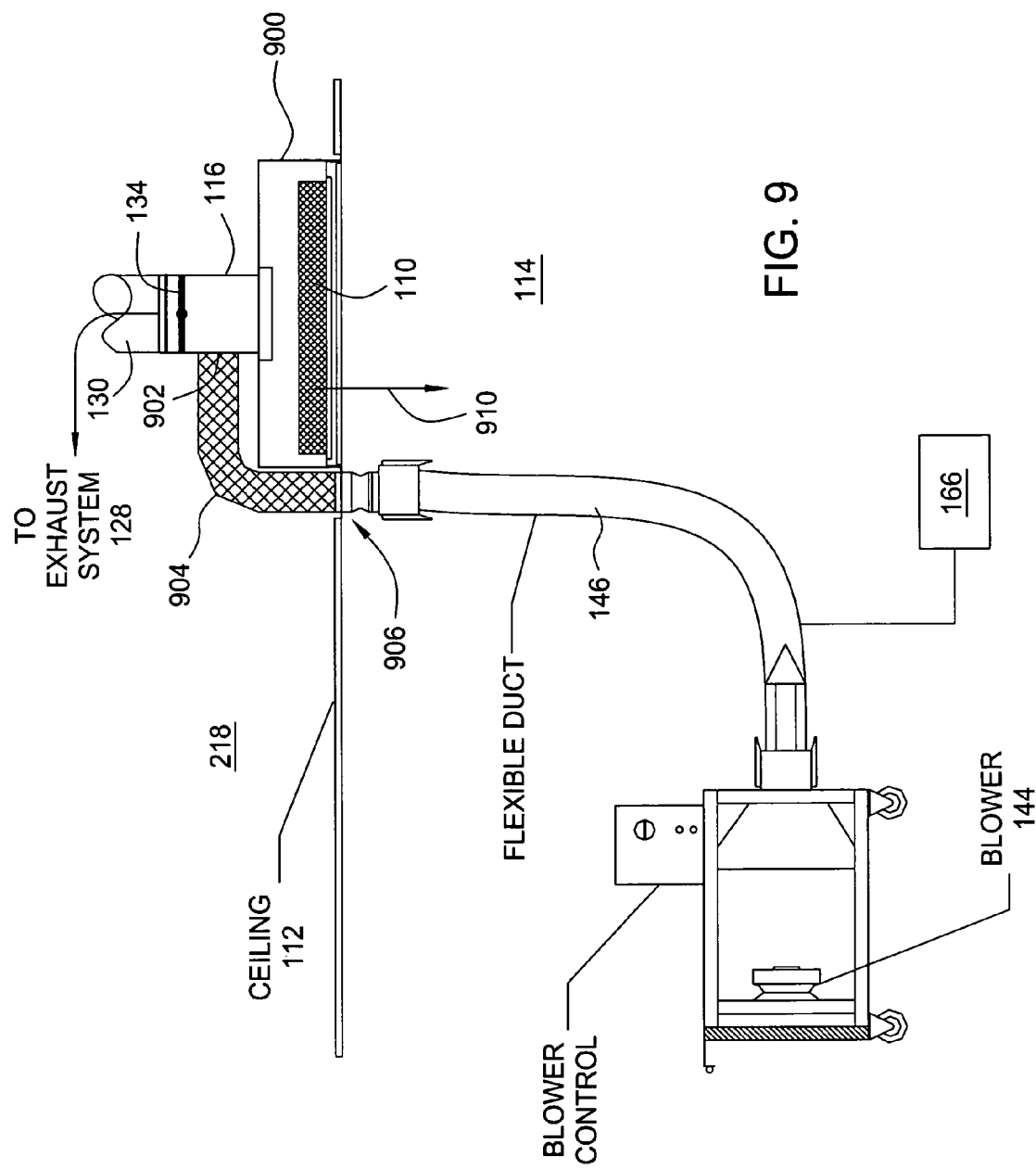
FIG. 9 is a schematic of another embodiment of a filter housing assembly.

FIG. 9 depicts another embodiment of a filter housing assembly 900 suitable for testing a filter element 110 in a reverse flow direction. The filter housing assembly 900 is generally similar to the housing assembly 100 described above except wherein the second air flow port 902 is formed in the collar 116 or ductwork 130 disposed above the ceiling 112 of the cleanroom 114. A duct 904 is routed in the interstitial space 218 above the ceiling 112 to a sealable aperture 906 formed in the ceiling 112 laterally offset from the filter housing assembly 900.

The blower 144 is coupled to the aperture by a duct 146 such that air may be introduced into the filter housing assembly 900 through the second air flow port 902. To ensure flow in the reverse direction, the damper 134 is typically positioned between the second air flow port 902 and the exhaust system 128, such that when the damper 134 is closed, air from the blower 144 is forced through the filter element 110 in the reverse flow direction as shown by arrow 910.

An aerosol generator 166 may be interfaced with the filter housing assembly 900 or duct 146 as described above so that the filter element 110 may be scanned from the cleanroom side of the ceiling 112.

Figure 10:
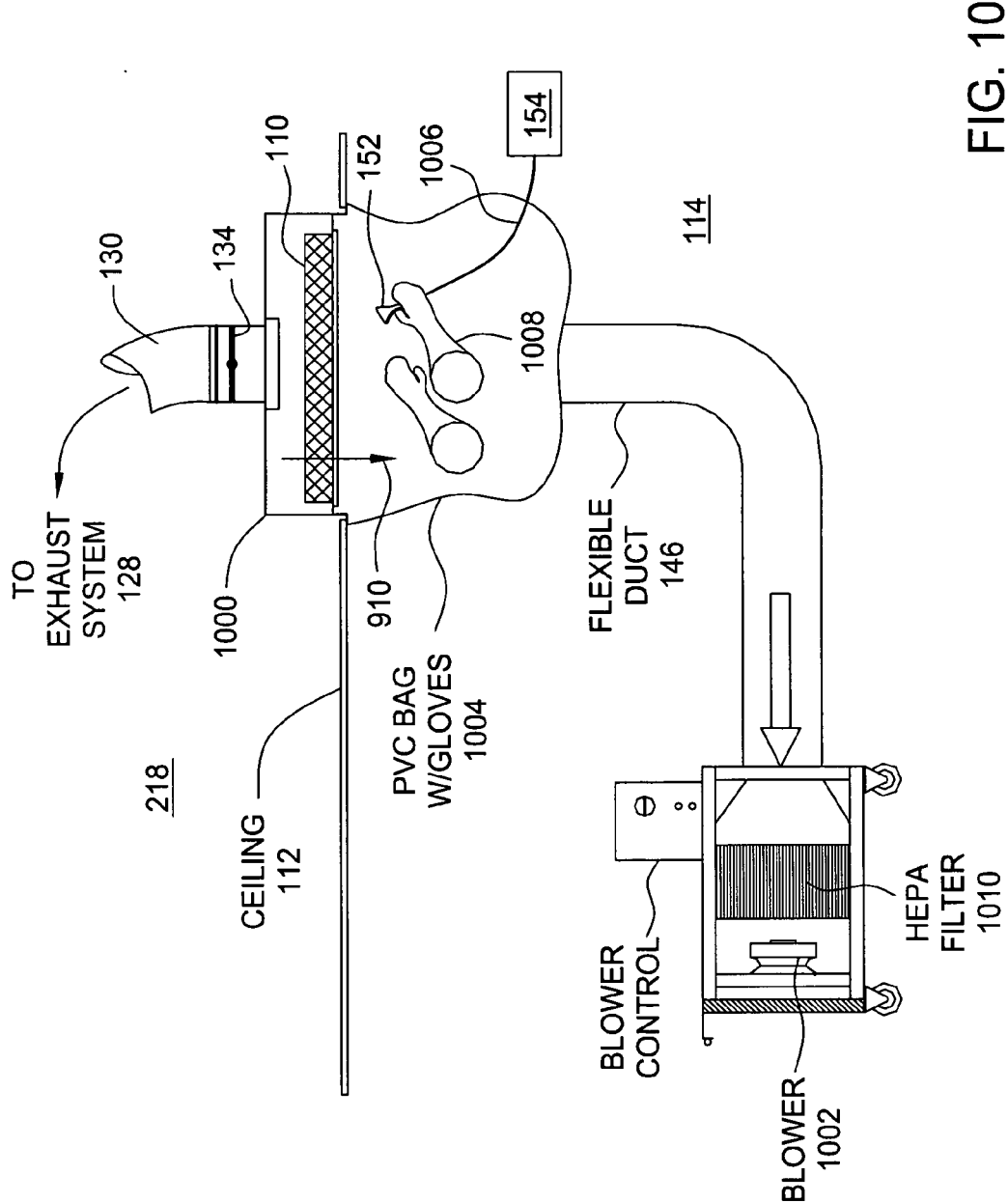
FIG. 10 is a schematic of another embodiment of a filter housing assembly.

FIG. 10 depicts another embodiment of a filter housing assembly 1000 suitable for testing a filter element 110 disposed in the housing assembly 1000 in the reverse flow direction, as shown by arrow 910. Generally, the filter housing assembly is substantially similar to the filter housing assembly 100 described above, except wherein the filter housing assembly 1000 does not include a second air flow port. Testing of the housing in the reverse flow direction is provided by pulling air through the filter element 110 utilizing a blower 1002. The blower is coupled to the face of the filter element 110 via a duct and PVC bag gloves 1004. The PVC bag may be mounted to the ceiling circumscribing the filter element, the filter element itself or a portion of the housing circumscribing a portion of the filter housing assembly 1000 circumscribing the filter element. The scan probe 152 is disposed in the bag 1004 and coupled to the tester 154 via a tube 1006 sealingly passing through the bag 1004. The gloves 1008 of the bag allow a technician to grasp the probe 152 and perform the scanning of the filter element 110. As the bag 1004 captures any particulate or contamination being passed into the cleanroom, such contaminants may be prevented from entering the cleanroom 114 by positioning a HEPA or other suitable filter 1010 in the duct 146 or blower 1002.

FIGS. 11A–11D depict alternate embodiments of the filter housing assembly 1000 interfaced with the bag 1004. In the embodiment depicted in FIG. 11A, a bag ring 1102 extends from the housing assembly 1000 toward the cleanroom 114 and circumscribes the filter element 110. The bag ring 1102 may include one or more bumps or grooves to enhance sealing of the bag 1004 to the bag ring 1102. Typically, an elastic cord or band 1104 is utilized to secure the bag 1004 to the bag ring 1102.

Figure 11A:
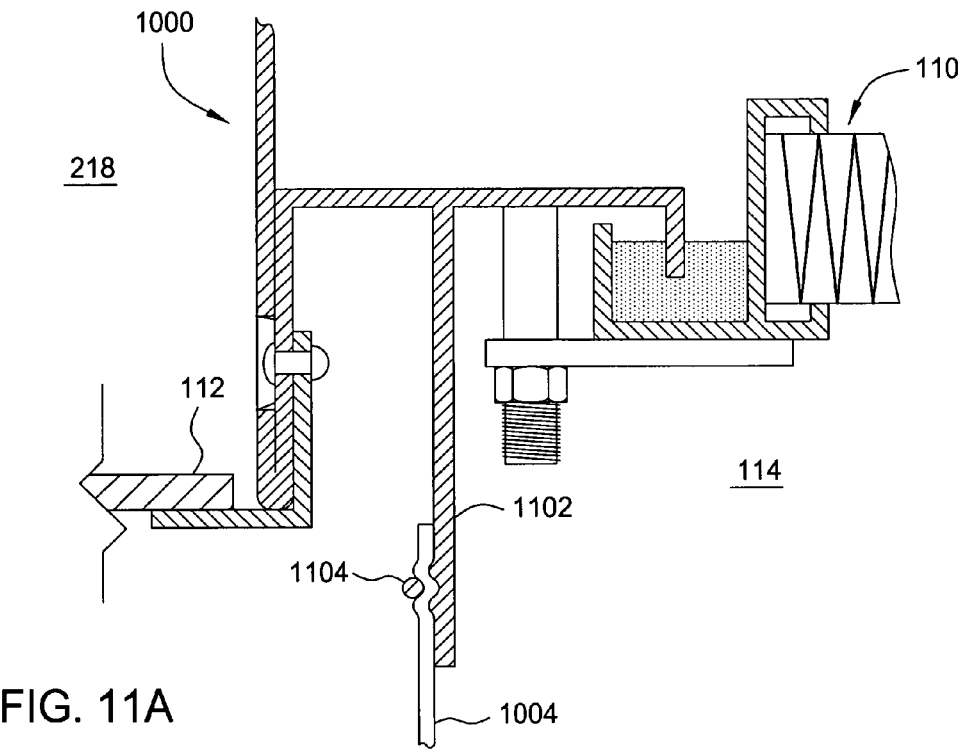
Figure 11B:
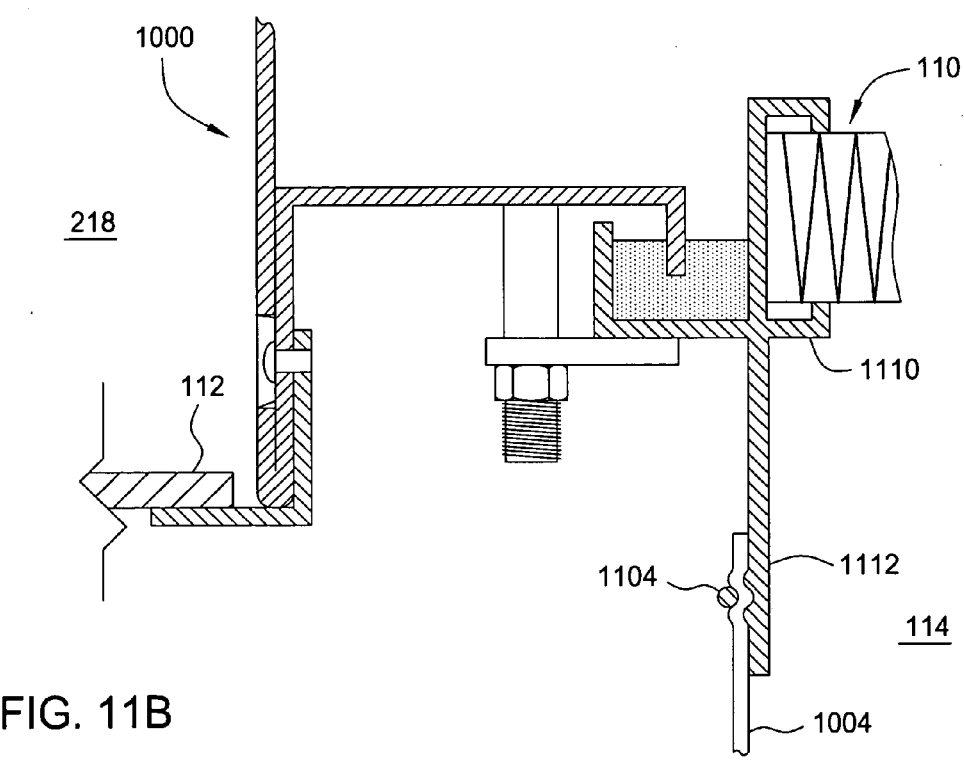

In the embodiment depicted in FIG. 11B, the bag 1004 is coupled to the filter element 110. For example, a frame 1110 of the filter element 110 includes a bag ring 1112 extending therefrom circumscribing the open face of the filter media of the filter element 110. In the embodiment depicted in FIG. 11C, the bag 1004 is coupled to the filter housing assembly 1000 via a trim ring 1120. For example, the trim ring may include a bag ring 1112 extending into the clean room 114 to facilitate coupling the bag 1004 thereto. In the embodiment depicted in FIG. 11D, a bag ring 1130 is coupled to the ceiling 112 and circumscribes the filter housing assembly 1000.

Thus, a filter housing assembly is provided that facilitates scan testing from the roomside of the cleanroom. Advantageously, a method for testing he filter housing assembly may be configured to capture contaminants which may be blown off the filter, thereby facilitating accurate and more reliable leak testing over conventional designs without worry about reintroducing contaminants into the cleanroom.

Although various embodiments which incorporate the teachings of the present invention have been shown and described in detail herein, those skilled in the art can readily devise many other varied embodiments that still incorporate these teachings.

What is claimed is:

1. A filter housing assembly for exhaust applications, comprising:
    a housing having a filter receiving aperture, a first air flow port configured to couple the housing to an exhaust system and a second air flow port sized to deliver a flow capable of providing at least 75 feet per minute of air flow through the filter receiving aperture in a direction opposite an operational air flow direction, and a third air flow port fluidly connected to the filter receiving aperture to an area upstream of the housing;
    a filter element sealingly disposed in the filter receiving aperture of the housing; and
    a cap operably sealing the second air flow port.

2. The filter housing assembly of claim 1 further comprising:
    a damper disposed in the first air flow port having a seal member movable to a position that provides a bubble-tight seal of the first air flow port.

3. The filter housing assembly of claim 2, wherein the damper further comprises:
    a gel seal material.

4. The filter housing assembly of claim 1, wherein the second air flow port is located on a same side of the housing as the filter receiving aperture.

5. The filter housing assembly of claim 1, wherein the housing further comprises:
    an internal wall separating an interior of the housing into a first plenum region defined between the first air flow port and the filter receiving aperture and a second plenum region communicating with the second air flow port.

6. The filter housing assembly of claim 1 further comprising:
    a hinge coupling the cap to the housing.

7. The filter housing assembly of claim 1 further comprising:
    a bagging ring coupled to the housing and circumscribing the filter receiving aperture.

8. The filter housing assembly of claim 1, wherein the second air flow port is coupled to a collar extending from the housing, wherein the collar also defines the first air flow port.

9. A filter housing assembly for exhaust applications, comprising:
    a housing having a first plenum and a second plenum defined therein, wherein the first plenum is smaller than the second plenum;
    a filter receiving aperture defined through the housing and communicating with the second plenum;
    a first air flow port defined through the housing and communicating with the second plenum, the first air flow port configured to couple the housing to an exhaust system such that an operational air flow direction is defined through the filter receiving aperture toward the first air flow port;
    a second air flow port defined through the housing and communicating with the first plenum, the second air flow port sized to deliver a flow capable of providing at least 75 feet per minute of air flow through the filter receiving aperture in a direction opposite the operational air flow direction; and
    a removable cap operably sealing the second air flow port.

10. The filter housing assembly of claim 9 further comprising:
    a damper disposed in the first air flow port having a seal member movable to a position that provides a bubble-tight seal of the first air flow port.

11. The filter housing assembly of claim 10, wherein the damper further comprises:
    a gel seal material or an inflatable gasket.

12. The filter housing assembly of claim 9, wherein the second air flow port is located on a same side of the housing as the filter receiving aperture.

13. The filter housing assembly of claim 12, wherein the housing further comprises:
    an internal wall separating the first plenum and the second plenum, the internal wall having an aperture allowing flow between the plenums.

14. The filter housing assembly of claim 9 further comprising:
    a hinge coupling the cap to the housing.

15. The filter housing assembly of claim 9 further comprising:
    a bagging ring coupled to the housing and circumscribing the filter receiving aperture.

16. The filter housing assembly of claim 9, wherein the second air flow port is coupled to a collar extending from the housing, wherein the collar also defines the first air flow port.

17. A filter housing assembly for exhaust applications, comprising:
    a housing having a first plenum and a second plenum defined therein, wherein the first plenum is smaller than the second plenum;
    a filter receiving aperture defined through the housing and communicating with the second plenum;
    a first air flow port defined through the housing and communicating with the second plenum, the first air flow port configured to couple the housing to an exhaust system such that an operational air flow direction is defined through the filter receiving aperture toward the first air flow port;
    a second air flow port defined through the housing and communicating with the first plenum, the second air flow port sized to deliver a flow capable of providing at least 75 feet per minute of air flow through the filter receiving aperture in a direction opposite the operational air flow direction;

a filter element disposed in the filter receiving aperture and sealing coupled to the housing;

a bagging ring coupled to the housing and circumscribing the filter receiving aperture;

an aerosol injection port disposed through the housing outward of the bagging ring;

a damper disposed in the first air flow port having a seal member movable to a position that provides a bubble-tight seal of the first air flow port; and a removable cap operably sealing the second air flow port.

* * * * *